(12) United States Patent
Zochowski et al.

(10) Patent No.: US 12,410,830 B2
(45) Date of Patent: Sep. 9, 2025

(54) ACCESS COVER ASSEMBLY

(71) Applicant: Moeller Mfg. Company, LLC, Wixom, MI (US)

(72) Inventors: Eric Zochowski, South Lyon, MI (US); H. Britt Bochiardy, Clearwater, FL (US); Gordon Boggie, Jupiter, FL (US); Bryan Rowe, Holly, MI (US)

(73) Assignee: Moeller Mfg. Company, LLC, Wixom, MI (US)

( * ) Notice: Subject to any disclaimer, the term of this patent is extended or adjusted under 35 U.S.C. 154(b) by 221 days.

(21) Appl. No.: 18/115,170

(22) Filed: Feb. 28, 2023

(65) Prior Publication Data
US 2023/0287927 A1 Sep. 14, 2023

Related U.S. Application Data

(60) Provisional application No. 63/317,733, filed on Mar. 8, 2022.

(51) Int. Cl.
*F16B 39/284* (2006.01)
*F16B 2/06* (2006.01)
(Continued)

(52) U.S. Cl.
CPC .......... *F16B 39/284* (2013.01); *F16B 2/06* (2013.01); *F16B 2/10* (2013.01); *F16M 1/00* (2013.01)

(58) Field of Classification Search
CPC ........ F16B 39/284; F16B 39/282; F16B 2/06; F16B 2/10; F16M 1/00; F16F 1/38; F01D 21/003; B64F 5/60
(Continued)

(56) References Cited

U.S. PATENT DOCUMENTS 3,750,267 A * 8/1973 Otto .................. F16M 1/00
29/523
5,083,819 A 1/1992 Bynum
(Continued)

FOREIGN PATENT DOCUMENTS

EP 0575563 A1 12/1993
WO 0136860 A1 5/2001

OTHER PUBLICATIONS

Search Report regarding French Patent Application No. 2302134, dated Aug. 1, 2024.

*Primary Examiner* — Christine M Mills
*Assistant Examiner* — Dil K. Magar
(74) *Attorney, Agent, or Firm* — Harness, Dickey & Pierce, P.L.C.

(57) ABSTRACT

An access cover assembly for machines, equipment, mechanical assemblies and like apparatus is configured to be mounted or attached to an exterior housing or casing of the apparatus to cover an access port or opening in the housing that is used for gaining access to the interior of the apparatus. The access cover assembly includes a cover plate and a removable, self-locking plug that can be quickly and easily installed and removed from the cover plate. The cover plate has a threaded access opening and the self-locking plug includes a threaded shaft that engages with the threaded access opening when secured to the cover plate. The self-locking plug incorporates a lock ring that inhibits unintended rotation and loosening of the self-locking plug when assembled to the cover plate.

4 Claims, 11 Drawing Sheets

(51) Int. Cl.
    *F16B 2/10*     (2006.01)
    *F16M 1/00*     (2006.01)

(58) Field of Classification Search
    USPC .............. 411/190, 166, 326, 327, 329, 951;
    D16/130
    See application file for complete search history.

(56) References Cited

U.S. PATENT DOCUMENTS

| | | | |
|---|---|---|---|
| 5,350,201 A | 9/1994 | Bynum | |
| 5,362,110 A * | 11/1994 | Bynum | F16L 19/005 |
| | | | 411/326 |
| 5,586,790 A | 12/1996 | Bynum | |
| 5,632,584 A * | 5/1997 | Acevedo | F16B 37/043 |
| | | | 411/182 |
| 5,823,702 A * | 10/1998 | Bynum | F16L 19/005 |
| | | | 285/82 |
| 5,897,277 A | 4/1999 | Barre et al. | |
| 6,220,803 B1 * | 4/2001 | Schellhase | F16B 5/0208 |
| | | | 411/114 |
| 6,445,177 B1 * | 9/2002 | Higgins | F16N 29/00 |
| | | | 411/7 |
| 6,678,903 B1 * | 1/2004 | Rhodes | E03C 1/0401 |
| | | | 137/359 |
| 8,840,348 B2 | 9/2014 | Marc | |
| 8,882,384 B2 * | 11/2014 | Bynum | B25B 23/141 |
| | | | 408/139 |
| 9,574,599 B2 | 2/2017 | Marc | |
| 9,593,700 B2 | 3/2017 | Bynum | |
| 9,909,446 B2 * | 3/2018 | Bynum | F01D 21/003 |
| 9,988,929 B2 * | 6/2018 | Smith | G02B 23/2492 |
| 10,145,406 B2 | 12/2018 | Marc | |
| 10,436,239 B2 | 10/2019 | Marc | |
| D888,122 S * | 6/2020 | Bynum | G01F 19/005 |
| | | | D16/130 |
| 2012/0051870 A1 * | 3/2012 | Cormier | F16B 39/284 |
| | | | 411/368 |
| 2014/0004738 A1 * | 1/2014 | Thoerner | H01R 24/76 |
| | | | 439/578 |
| 2015/0198198 A1 * | 7/2015 | Dundas | F16B 37/14 |
| | | | 411/326 |
| 2016/0194976 A1 | 7/2016 | Smith | |
| 2017/0067361 A1 | 3/2017 | Bynum | |
| 2017/0343034 A1 * | 11/2017 | Zollmann | F16B 39/04 |
| 2018/0252118 A1 | 9/2018 | Smith | |
| 2020/0339192 A1 * | 10/2020 | Myklebust | B62D 7/222 |

* cited by examiner

ACCESS COVER ASSEMBLY

CROSS-REFERENCE TO RELATED APPLICATIONS

This application claims the benefit of U.S. Provisional Application No. 63/317,733, filed on Mar. 8, 2022. The entire disclosure of the above application is incorporated herein by reference.

FIELD

The present disclosure relates to a removable cover for machines, equipment, mechanical assemblies and the like that enable access to internal features and/or components of the apparatus.

BACKGROUND

This section provides background information related to the present disclosure which is not necessarily prior art.

Machines, equipment, mechanical assemblies and the like often include panels or covers that are removably fastened or affixed to a housing or casing of the apparatus by use of fasteners. See FIG. 1, Prior Art. The access covers enable access to the internal workings, features and/or components of the apparatus to enable the apparatus to be inspected, maintained, serviced or repaired. Access covers are known to be used on aircraft and land-based turbine engines.

Conventional access covers are attached to the apparatus by a plurality of fasteners (e.g., threaded fasteners such as mounting bolts) that can be tightened to a specified torque. In some applications, it is important to further ensure that the fasteners attaching the access cover to the apparatus do not loosen during normal operation or use of the apparatus. One known manner in which to lessen a tendency for the attachment bolts to loosen is by securing the mounting bolts together with a wire that counteracts a loosening of the fastener.

Lock wire, also known as safety wire, is often used in situations where mechanical reliability is critical. For example, in aircraft applications, safety wire is used to secure the fasteners attaching the access covers to mechanical assemblies, as well as with other fasteners in the aircraft. This is because the significant vibration and other forces that act on the aircraft and its components can contribute to the fasteners inadvertently becoming loose.

In order to remove an access cover that has been fastened and lockwired to an apparatus, however, such as for inspecting the apparatus, the lock wire needs to be cut off and disconnected from the mounting bolts before the mounting bolts can be loosened and removed. Thereafter, the access cover can be removed to make the needed internal workings of the apparatus available to service personnel. After the inspection or other work is performed, the mounting bolts are used to reattach the access cover in place on the apparatus and the fasteners must be re-lockwired. This process requires a particular skill set, is very labor intensive and time consuming. Thus, the costs to perform routine maintenance, inspection or other service activities are unnecessarily increased.

Furthermore, in some applications, the maintenance, inspection or service activity needed to be performed on the apparatus does not require as much space or availability as is afforded by the complete removal of the access cover. Nevertheless, conventional access covers must be removed in their entirety in order to gain any access to the internal features or components of the apparatus. Still further, the access cover on some apparatus may be located in a manner such that there is limited space to easily employ or manipulate the tools that are needed to remove the lock wire, unfasten the fasteners and/or visually locate the access cover. These conditions add further difficulties, labor and cost to otherwise routine tasks.

SUMMARY

This section provides a general summary of the disclosure and is not a comprehensive disclosure of its full scope or all of its features.

The present disclosure provides an access cover assembly for machines, equipment, mechanical assemblies and like apparatus. The access cover assembly is configured to be mounted or attached to an exterior housing or casing of an apparatus to cover an access port or opening in the housing that is used for gaining access to the interior of the apparatus. The access cover assembly includes a cover plate and a removable, self-locking plug that can be quickly and easily installed and removed from the cover plate. The cover plate has an access opening and the self-locking plug that can be secured to the cover plate. The self-locking plug incorporates a lock ring that inhibits unintended rotation and loosening of the self-locking plug when assembled to the cover plate.

In one aspect of the disclosure, an access cover assembly can including a cover plate and a self-locking plug removably attached to the cover plate. The cover plate can include a central portion and a mounting flange positioned about a perimeter of the central portion. The flange can have a plurality of apertures configured to accommodate a plurality of mounting bolts for attaching the access cover assembly to, e.g., a piece of machinery or equipment. The cover plate can also have a first aperture having a first diameter and a second aperture having a second diameter that is greater than the first diameter. The first aperture can be centered on a central axis and extend through the central portion. The first aperture can include a first inner circumferential wall that has an internal screw thread. The second aperture can also be centered on the central axis and be concentric with the first aperture. The second aperture extend into the central portion to a depth that is less than a thickness of the central portion (e.g., like a counter-bore). The second aperture can have a second inner circumferential wall with a plurality of concave-shaped detents equally spaced about a perimeter of the second inner circumferential wall. Adjacent detents can be separated from one another by a substantially planar or substantially cylindrical surface.

The self-locking plug can be disposed in the first aperture and the second aperture along the central axis. The self-locking plug can include a main body and a lock ring attached to the main body. The main body can have a head and a shaft, with the head being configured to receive a tool for rotating the self-locking plug about the central axis. The shaft can include an external screw thread.

The lock ring can include a cylindrical portion attached to the head and a plurality of resilient, flexible beam fingers arranged about a circumference of the main body. Each beam finger can extend from a proximal end at the cylindrical portion to a distal end comprising a fingertip. Each fingertip of the plurality of beam fingers can include a plurality of radially inwardly beveled surfaces and a substantially planar surface between the beveled surfaces, The fingertip can be configured to mechanically interact with the second inner circumferential wall of the second aperture so as to inhibit rotation of the self-locking plug about the central axis.

In another aspect of the disclosure, an access cover assembly can include a cover plate and a removable, threaded, self-locking plug configured to detachably connect to the cover plate. The cover plate can have a detent interface that is co-operable with the self-locking plug. The detent interface can include a boss projecting from a central portion of the cover plate, the boss having a second diameter and including a second outer circumferential wall with a cylindrical surface. In the second outer circumferential wall a plurality of spaced-apart, concave-shaped detents are included that are equally spaced about a perimeter of the second outer circumferential wall. Adjacent detents can be separated from one another by discrete sections of the cylindrical surface of the outer circumferential wall.

A first aperture having a first diameter and being concentric with the boss can be included in the cover plate. The first aperture can extend along an axis through both the boss and the central portion of the cover plate. The first aperture can also include an inner circumferential wall defining an internal screw thread. The boss can define an interface port for the self-locking plug and the first aperture can define an access opening through the cover plate.

The self-locking plug can include a main body and a lock ring that is attached to the main body. The main body can have a head and a shaft, and the head can have a tool engaging interface and the shaft can have an external screw thread. The lock ring can include an upper section that is attached to the head of the main body and a plurality of resilient, flexible beam fingers that are arranged about a circumference of the upper section. Each beam finger can extend from a cylindrical portion of the upper section of the lock ring to a distal end that includes a plurality of beveled surfaces and is configured to mechanically interact with the detent interface to inhibit rotation of the self-locking plug about the axis.

In still another aspect of the disclosure, an access cover assembly can include a cover plate and a removable, threaded, self-locking plug configured to detachably connect to the cover plate. The cover plate can have a detent interface that is co-operable with the lock ring to inhibit unintended loosening of the plug. The detent interface can have a boss projecting from a central portion of the cover plate and the boss can include a cylindrical outer wall having an outer diameter. The cylindrical outer wall of the boss can define an external screw thread. A first aperture of the cover plate can include a first diameter and extend along an axis through the boss and the central portion of the cover plate. A second aperture in the boss can include a second diameter that is greater than the first diameter and concentric with the cylindrical outer wall of the boss, The second aperture can have a depth that is less than a height of the boss and include a plurality of spaced-apart, concave-shaped detents that are equally spaced about a perimeter of the second aperture. Adjacent detents can be separated from one another by discrete cylindrically shaped sections of the second aperture. The boss can define an interface port for the self-locking plug and the first aperture can define an access opening through the cover plate.

The self-locking plug can include a cylindrical, cap-like main body and a lock ring that is attached to the main body. The main body can have a sleeve including an internal, cylindrically shaped surface defining an internal screw thread.

The lock ring can include an upper section attached to the main body and a plurality of resilient, flexible beam fingers arranged about a circumference of the upper section. Each beam finger can extend from a cylindrical portion of the upper section to a distal end, which distal end include a plurality of beveled surfaces and is configured to mechanically interact with the detent interface to inhibit rotation of the self-locking plug about the axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding references indicate corresponding parts throughout the several views of the drawings.

DETAILED DESCRIPTION

Example embodiments will now be described more fully with reference to the accompanying drawings. The example embodiments are provided so that this disclosure will be thorough and fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
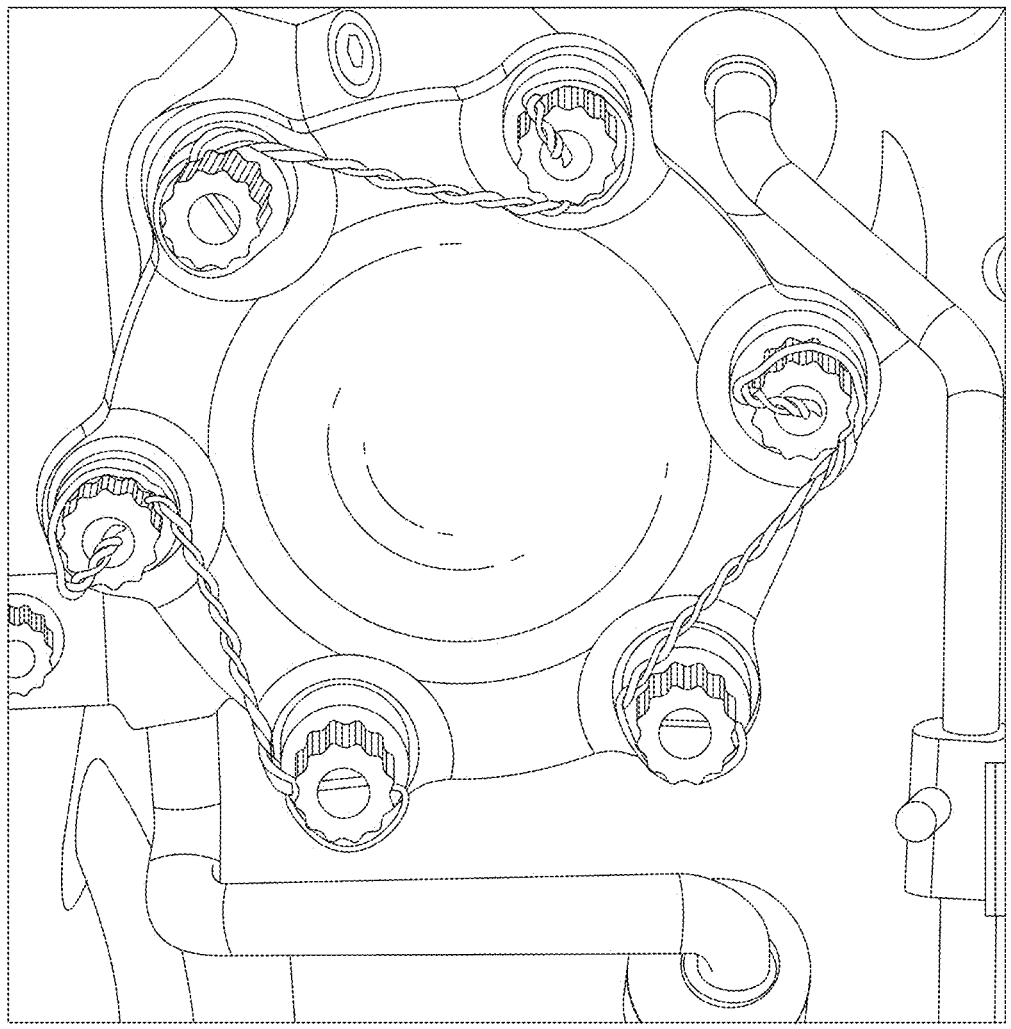
FIG. 1 shows a conventional, prior art, access cover.
Figure 2:
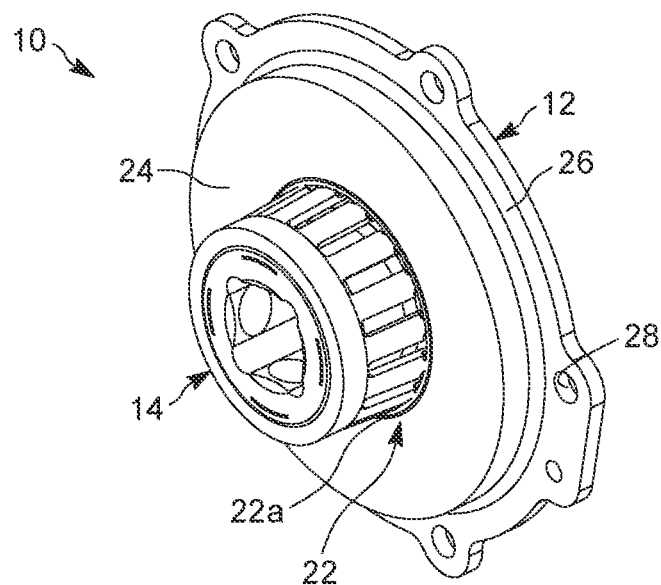
FIG. 2 shows an isometric view of an access cover assembly according to the principles of the present disclosure.
Figure 3:
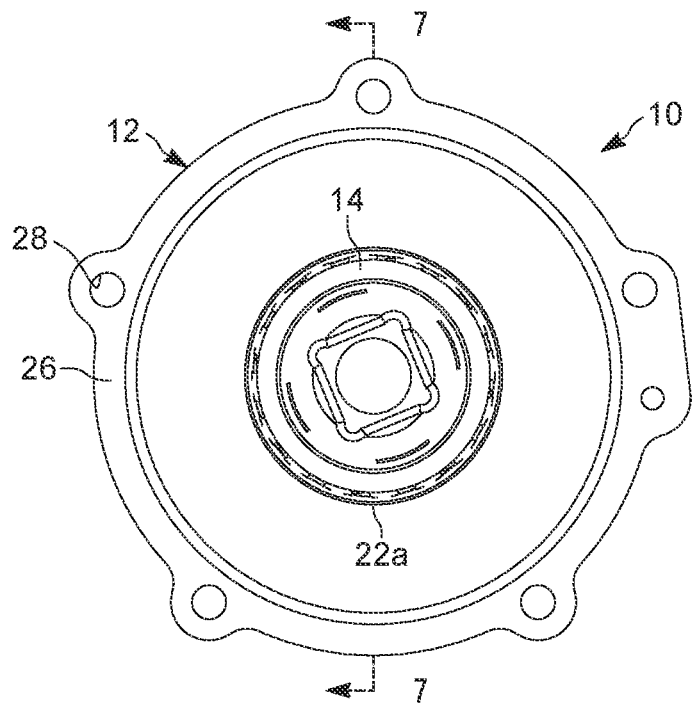
FIG. 3 shows a front view of the access cover assembly of FIG. 2.
Figure 4:
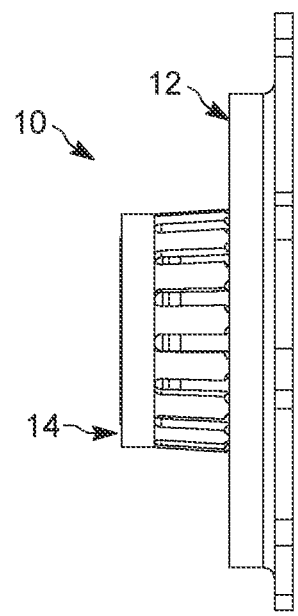
FIG. 4 shows a right side view the access cover assembly of FIG. 2.

The present disclosure provides an access cover assembly 10 (e.g., FIGS. 2-4) for machines, equipment, mechanical assemblies and like apparatus. The access cover assembly is configured to be mounted or attached to an exterior housing or casing of an apparatus (e.g., a mechanical assembly like a gear box) to cover an access port or opening in the housing that is used for gaining access to the interior of the apparatus.

Figure 5:
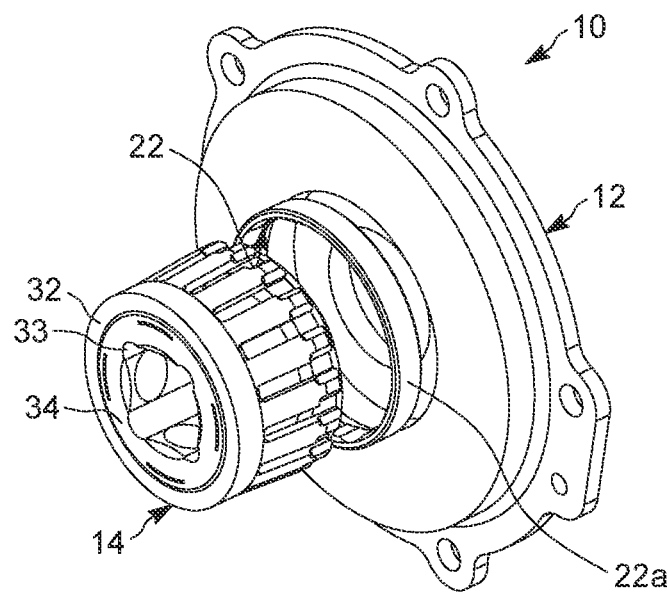
FIG. 5 shows an exploded isometric view of the access cover assembly of FIG. 2.
Figure 8:
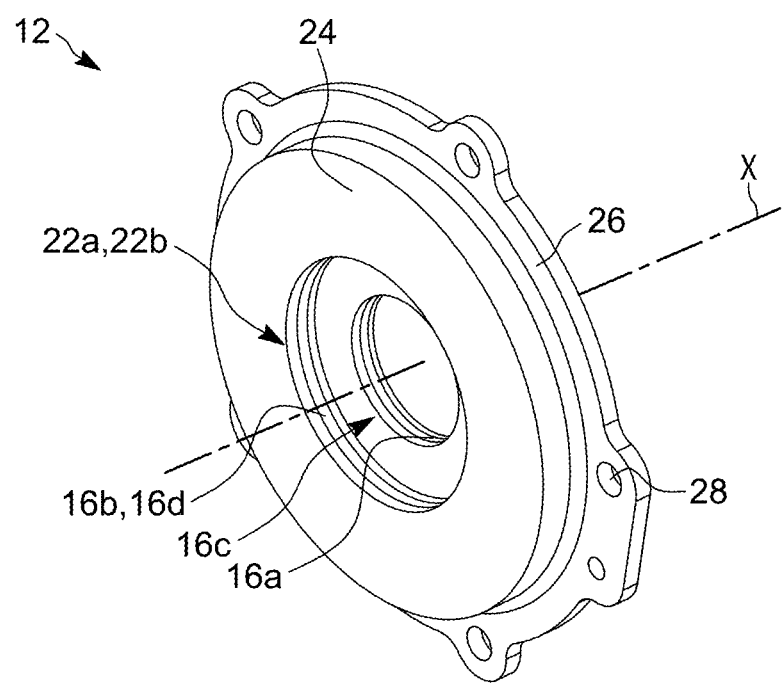
FIG. 8 shows an isometric view of the cover plate of the access cover assembly of FIG. 2.

The access cover assembly 10 generally includes a cover plate 12 (e.g., FIGS. 8-10) and a removable, threaded, self-locking plug 14 (e.g., FIGS. 11-12) configured to detachably connect to the cover plate 12. The cover plate 12 has an access opening 16 and the self-locking plug 14 can be secured to the cover plate 12, e.g., via a threaded shaft 36 on the plug 14 that engages a threaded access opening 16 in the cover plate 12. Further, the self-locking plug 14 incorporates a lock ring 20 that is co-operable with a detent interface 22 associated with the cover plate 12 to inhibit unintended rotation and loosening of the self-locking plug 14 when assembled to the cover plate 12. In this regard, the detent interface 22 can be integrally formed in the cover plate 12 or alternatively be provided by way a separate detent ring 22a (e.g., FIG. 13) that can be assembled with or securely affixed to the cover plate 12. The self-locking plug 14 nevertheless can be quickly and easily installed and removed with a tool (e.g., a wrench or ratchet drive, see FIG. 5, socket 33) with routine effort and without possessing a special skill set.

The removable, self-locking plug 14 eliminates the need to remove the entire cover plate 12 to gain access to the interior of the apparatus, particularly in circumstances where a smaller diameter port (i.e., relative to the diameter or size of the cover plate 12) may satisfy the access to the apparatus that is required for conducting regular inspection or maintenance tasks. As such, it is unnecessary to cut and remove any lock wire or other fastener locking systems and all of the mounting bolts that secure the access cover to the apparatus, and then reattach the access cover and lockwire the mounting bolts when the task is complete.

Figure 9:
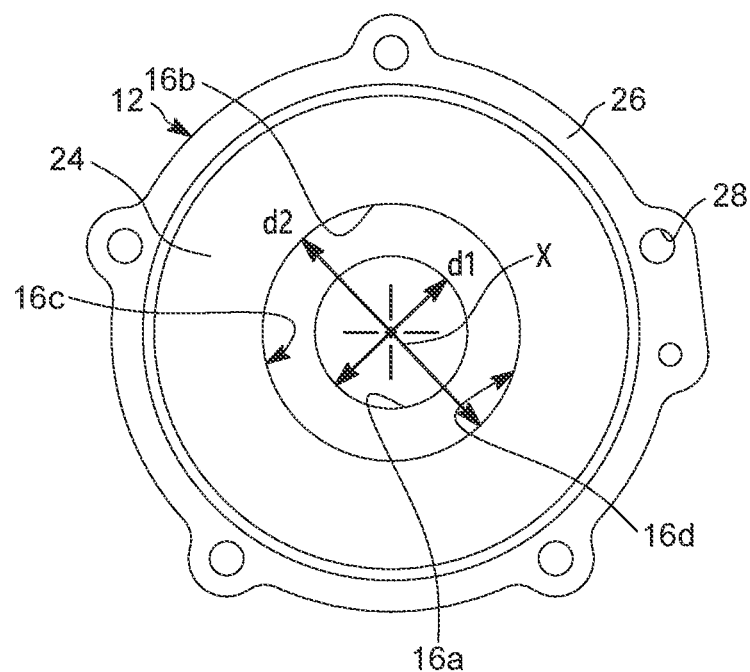
FIG. 9 shows a front view of the cover plate of FIG. 8.
Figure 10:
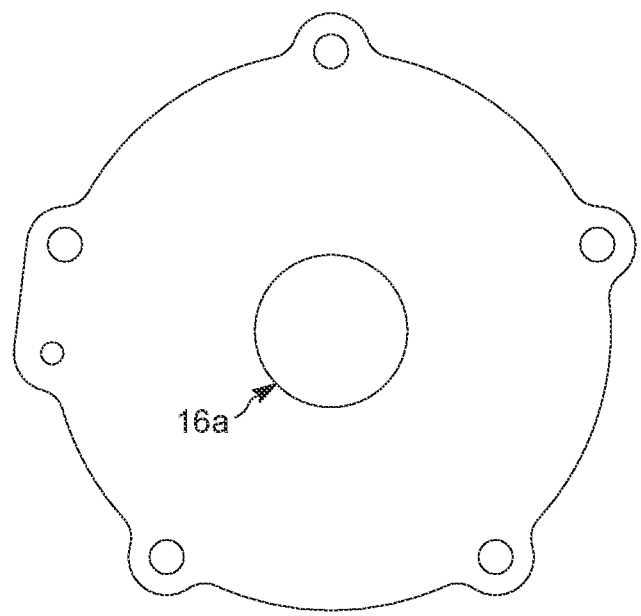
FIG. 10 shows a back view of the cover plate of FIG. 8.
Figure 11:
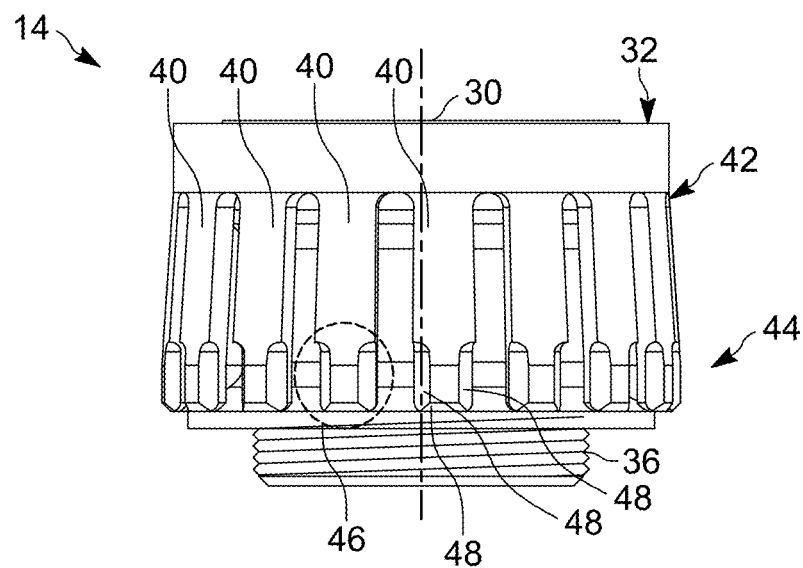
FIG. 11 shows a front view of the self-locking plug of the access cover assembly of FIG. 2.

The access cover assembly 10 can include a cover plate 12 and a self-locking plug 14 removably attached to the cover plate 12. As shown in FIGS. 9-11, the cover plate 12 can have a central portion 24 and a mounting flange 26 disposed about a perimeter of the central portion 24. The cover plate 12 can be appropriately shaped and sized to fit an opening, e.g., in the housing, of the apparatus. As such, the cover plate 12 can be designed in any of a variety of geometric configurations (e.g., polygonal, circular, hemispherical, etc.). The mounting flange 26 can be adapted to interface with the apparatus at the access opening 16 and can include a plurality of apertures 28 configured to accommodate a plurality of fasteners (e.g., mounting bolts) to secure the access cover assembly 10 to the apparatus.

Figure 13:
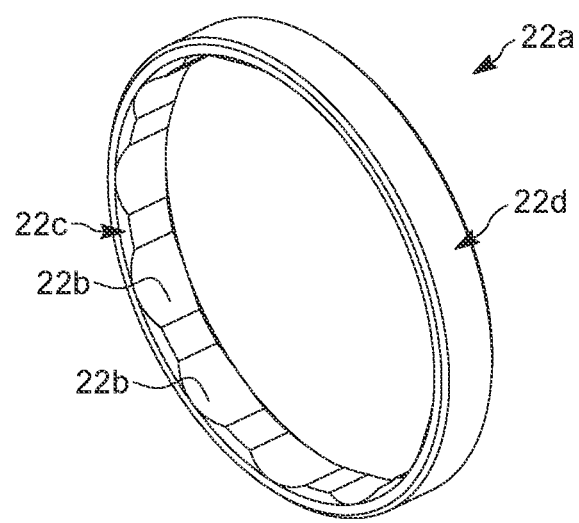
FIG. 13 shows an isometric view of the detent ring of the access cover assembly of FIG. 2.

As shown in FIGS. 9 and 10, the cover plate 12 can include a first aperture (or access opening) 16a having a first diameter d1 and a second aperture 16b having a second diameter d2 that is greater than the first diameter d1. The second aperture 16b is concentric with the first aperture 16a. The first aperture 16a and second aperture 16b can be located on a axis X of the access cover assembly 10 that is central to the cover plate 12 (e.g., FIG. 8) or, alternatively, on an axis that is offset from the central axis X of the cover plate 12. The first aperture 16a extends through the central portion 24 of the cover plate 12. The first aperture 16a also defines a first inner circumferential wall 16c comprising an internal screw thread. The concentric, second aperture 16b extends into the central portion 24 for a depth that is less than a thickness of the central portion 24. As such, the second aperture 16b is akin to a counter-bore about the first aperture 16a. The second aperture 16b comprises the detent interface 22. In this respect, the second aperture 16b has a second inner circumferential wall 16d. In one aspect of the present disclosure, the second inner circumferential wall 16d comprises a cylindrical surface including a plurality of spaced-apart, concave-shaped detents 22b equally spaced about a perimeter of the second inner circumferential wall 16b. Adjacent detents 22b are separated from one another by discrete sections of the cylindrical surface of the inner circumferential wall 16d (best understood with reference to FIG. 13). As seen in FIG. 13, the number of detents shown is 12, although the number of detents can vary, with an exemplary range of between 8 and 16 detents.

The self-locking plug 14 of the access cover assembly 10 is oriented along the axis X of and disposed in the first aperture 16a and the second aperture 16b of the cover plate 12.

Figure 12:
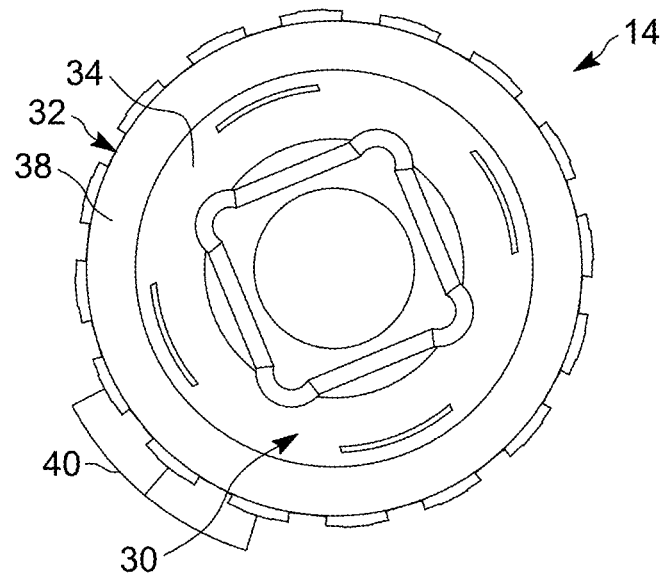
FIG. 12 shows a top view of the self-locking plug of FIG. 11.

As shown in FIGS. 12-13, the self-locking plug 14 includes a main body 30 and a lock ring 32 that is attached to the main body 30. The main body 30 comprises a head 34 and a threaded shaft 36. The head 34 is configured to receive a tool (e.g., a wrench or ratchet drive) for rotating the self-locking plug 14 about a centerline or central axis X1 of the self-locking plug 14 and the threaded shaft 36 includes an external screw thread that mates with (i.e., engages) the internal screw thread 16c of the access opening 16a.

The lock ring 32 includes a cylindrical portion 38 that is attached to the head 34 of the main body 30 and a plurality of resilient, flexible (e.g., spring-like) beam fingers 40 that are arranged about a circumference of the cylindrical portion 38. Each beam finger 40 extends from a proximal end 42 (at the cylindrical portion of the lock ring) to a distal end 44 that forms a fingertip 46. Each fingertip 46 of the beam fingers 40 includes a plurality of beveled surfaces 48. In an aspect of the disclosure, the beveled surfaces 48 of the fingertips 46 of the beam fingers 40 are located on the outer side of the beam fingers 40 (i.e., outwardly facing away from the centerline of the self-locking plug 14). The fingertip 46 is configured to mechanically interact with (e.g., exhibit a bias against) the detent interface 22 of the second aperture 16b so as to inhibit rotation of the self-locking plug 14 about the central axis X1. The number of beam fingers can vary, with a range of between about 12 to 20 being exemplary.

In another aspect of the disclosure, as shown in FIG. 13, a detent ring 22a that is separate from the cover plate 12 can provide the feature of the second inner circumferential wall 16d of the second aperture 16b. In this respect, the separate detent ring 22a can include the inner circumferential and cylindrical wall 22c comprising the plurality of detents 22b, and have an outer circumferential wall 22d comprising an outer cylindrical surface. The detent ring can then be secured (e.g., by an interference fit, welding, or otherwise) in the second aperture 16b of the cover plate 12.

Figure 14:
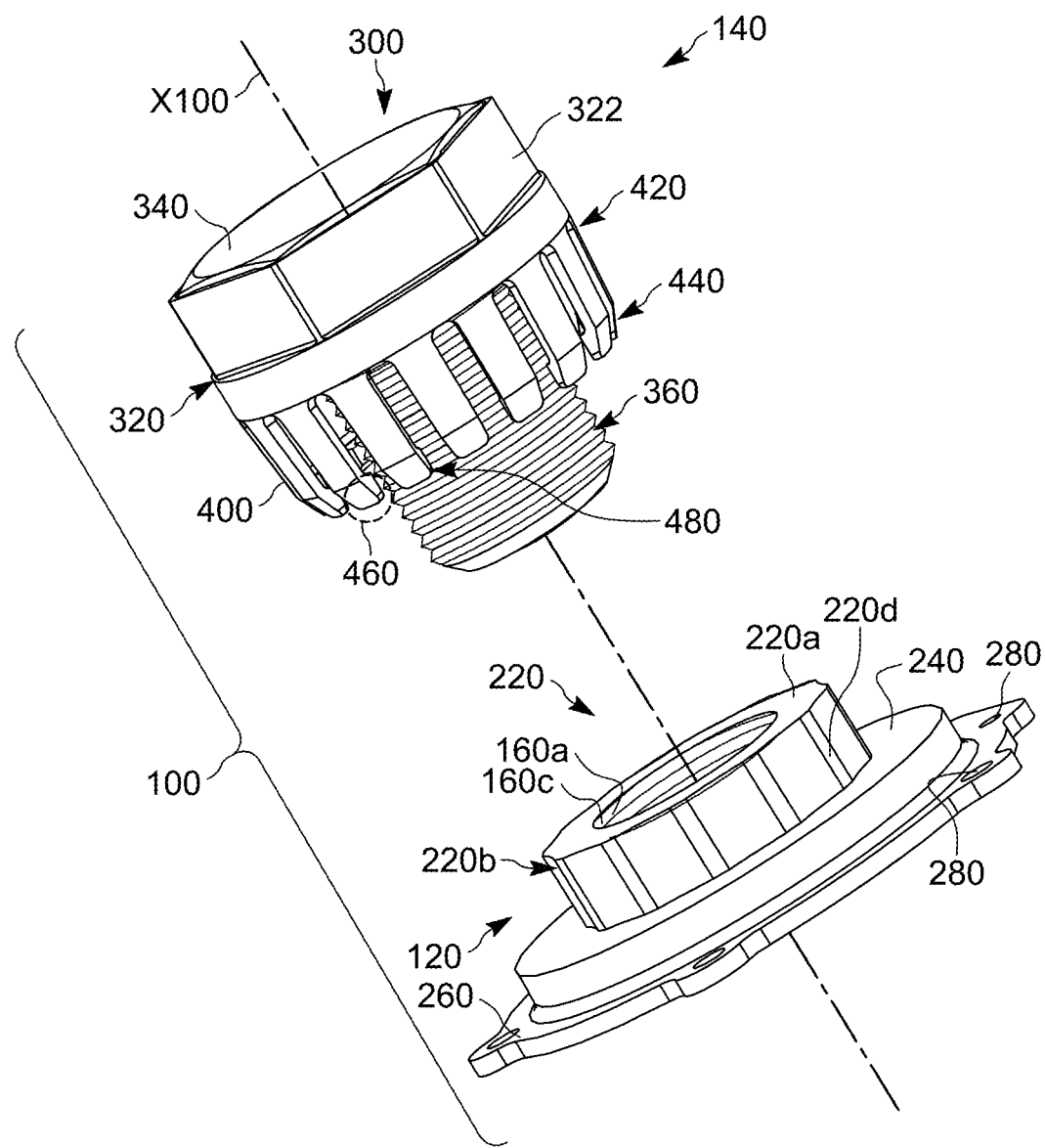
FIG. 14 shows a partially exploded isometric view of an alternative access cover assembly of the present disclosure.
Figure 15:
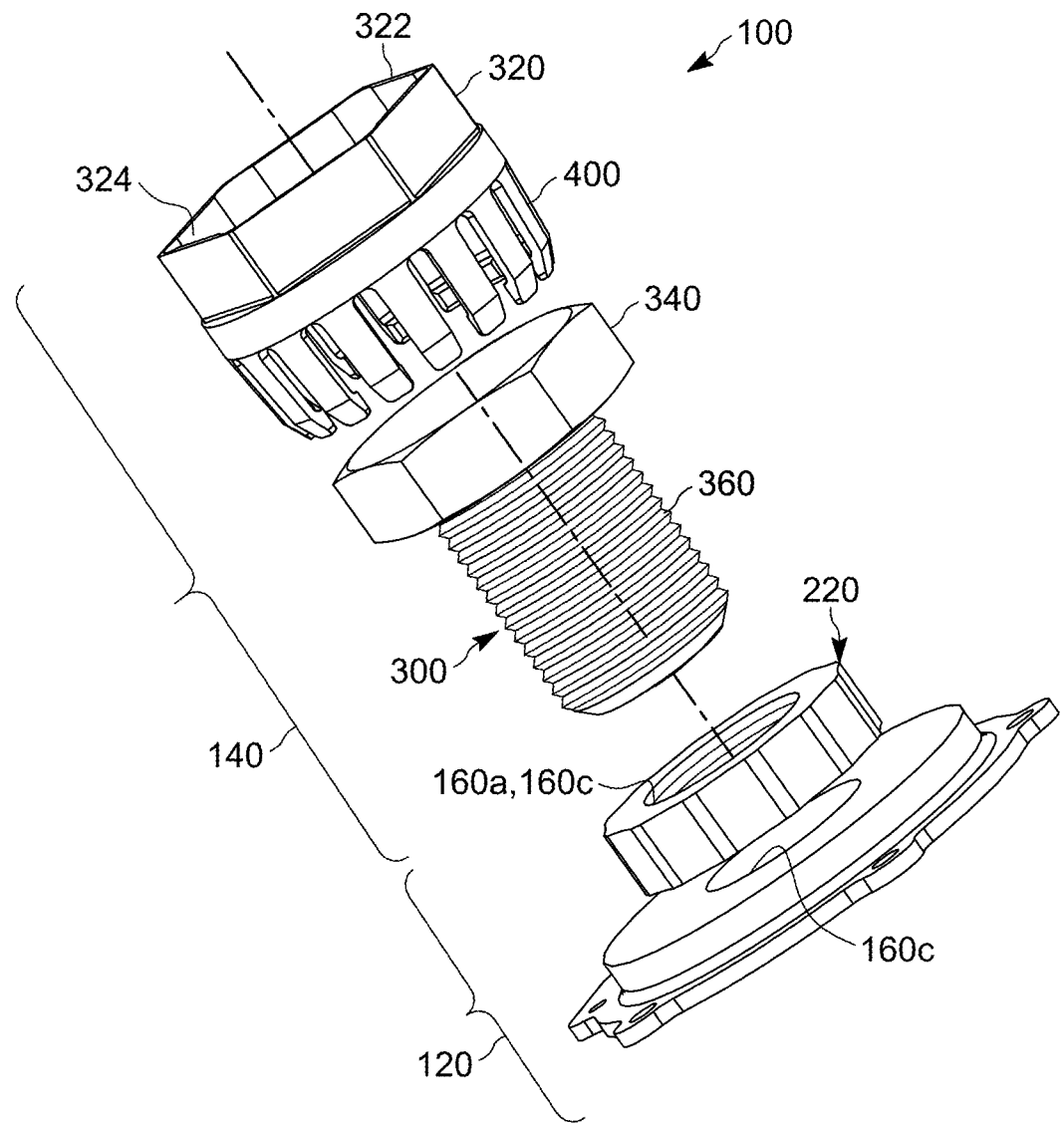
FIG. 15 shows an exploded isometric view of the access cover assembly of FIG. 14.
Figure 16:
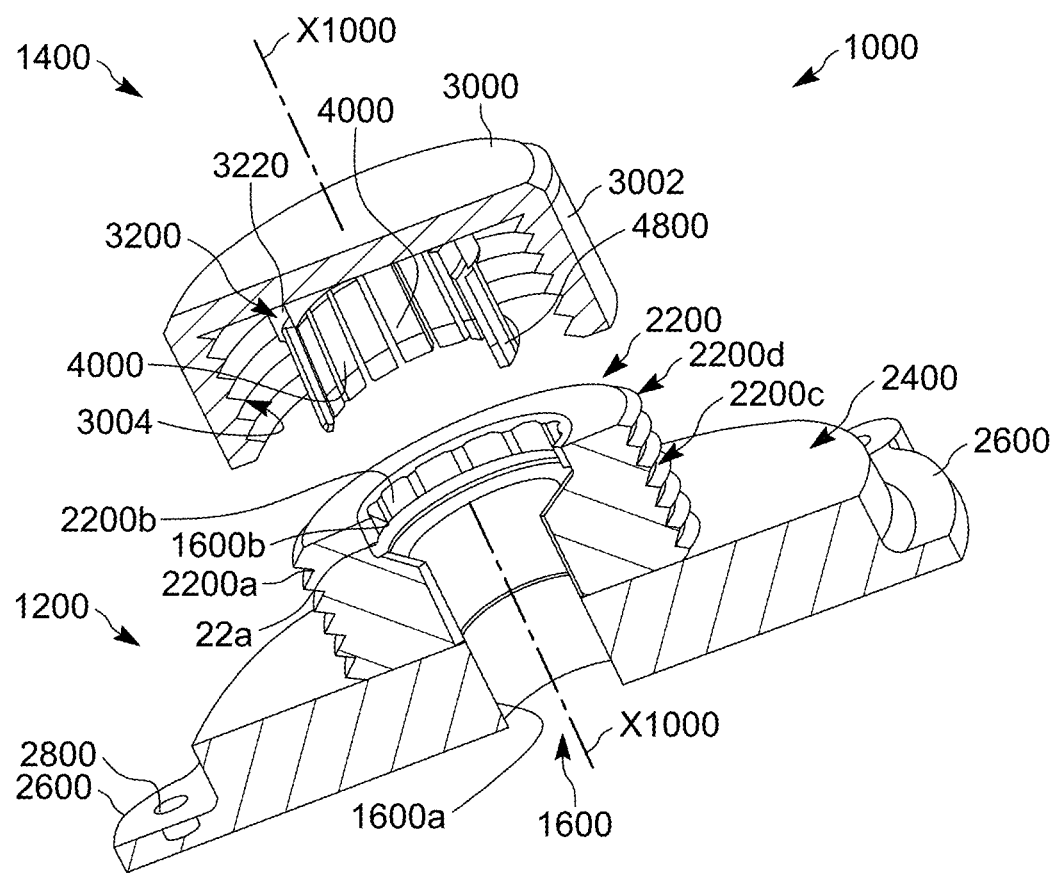
FIG. 16 shows a partially exploded isometric cross-sectional view of still another alternative access cover assembly of the present disclosure.

In still another aspect of the disclosure, an alternate access cover assembly 100 is shown in FIGS. 15 and 16. Like the access cover assembly 10 already discussed, the access cover assembly 100 shown in FIG. 14 generally includes a cover plate 120 and a removable, threaded, self-locking plug 140 configured to detachably connect to the cover plate 120. The self-locking plug 140 incorporates a lock ring 320 that is co-operable with a detent interface 220 associated with the cover plate 120 to inhibit unintended rotation and loosening of the self-locking plug 140 when assembled to the cover plate 120. The self-locking plug 140 nevertheless can be quickly and easily installed and removed with a tool.

The cover plate 120 incorporates a detent interface 220 that is co-operable with the lock ring 320 to inhibit unintended loosening. In this respect, the cover plate 120 of the access cover assembly 100 of FIG. 14 can include a boss 220a projecting from the central portion 240. The boss 220a can have a second diameter and include a second outer circumferential wall 220d. The outer circumferential wall 220d of the boss 220a can comprise a cylindrical surface in which are included a plurality of spaced-apart, concave-shaped detents 220b that are equally spaced about a perimeter of the second outer circumferential wall 220d. Adjacent detents 220a can be separated from one another by discrete sections of the cylindrical surface of the outer circumferential wall 220d. The number of detents can vary, and a range of between about 8 and 16 detents is exemplary.

A first aperture 160a, having a first diameter and being concentric with the boss 220a, can extend through both the boss 220a and the central portion 240 of the cover plate 120. The first aperture 160a can also include an inner circumferential wall 160c defining an internal screw thread. The self-locking plug 140 can engage the threaded access opening 160c when the self-locking plug 140 is secured to the cover plate 120 as further described herein.

The boss 220a can define an interface port for the self-locking plug 140 and the first aperture 160a can define an access opening 160 through the cover plate 120. As can be understood with reference to FIGS. 15 and 16, the boss 220a can, alternatively, be integrally formed with the cover plate 120 or be a separate component that is securely affixed to the cover plate 120. Further, it is also contemplated that the detent interface 220 can be integrally formed in the outer circumferential wall of the boss 220a or, alternatively, can be provided by way of a separate detent interface component (e.g., a detent ring) that can be assembled with or secured to the outer cylindrical surface 220d of the boss 220a.

Also shown in FIGS. 15 and 16 is a removable, threaded, self-locking plug 140 configured to detachably connect to the cover plate 120. The self-locking plug 140 includes a main body 300 and a lock ring 320 that is attached to the main body 300. The main body 300 comprises a head 340 (e.g., a hexagonal head) and a threaded shaft 360. The self-locking plug 140 is configured to accommodate a tool (e.g., a wrench or ratchet drive) for rotating the self-locking plug 140 about a centerline or central axis X100 of the self-locking plug 140. The threaded shaft 360 includes an external screw thread that engages the internal screw thread 160c of the access opening 160a of the cover plate 120.

The lock ring 320 of the self-locking plug 140 includes an upper section 322 that is attached to the head 340 of the main body 300 and a plurality of resilient, flexible (e.g., spring-like) beam fingers 400 that are arranged about a circumference of the upper section 322. Each beam finger 400 extends from a proximal end 420 (at a cylindrical portion of the upper section 322 of the lock ring 320) to a distal end 440 that forms a fingertip 460. Each fingertip 460 of the beam fingers 460 includes a plurality of beveled surfaces 480. In an aspect of the disclosure, the beveled surfaces 480 of the fingertips 460 of the beam fingers 400 are located on an inner side of the beam fingers 400 (i.e., inwardly facing the centerline X100 of the self-locking plug 140). The fingertip 460 is configured to mechanically interact with (e.g., exhibit a bias against) the detent interface 220 (e.g., on the boss 220a) of the cover plate 120 so as to inhibit rotation of the self-locking plug 140 about the central axis X100. The number of beam fingers can vary, with a range of between about 12 to 20 being exemplary.

As can be understood with reference to FIG. 15, it is contemplated that the upper portion 322 of the lock ring 320 can include an aperture 324 into which the head 340 of the main body 300 can be disposed. As shown in the FIGS. 15-16, the aperture 324 and head 340 are hexagonally shaped. It is further contemplated that a fixed connection between the aperture 324 of the lock ring 320 and the head 340 of the main body 300 can be achieved by any of a variety of known connection methods, including an interference fit, welding or the like. Once assembled, the head portion 340 of the self-locking plug 140 provides a ready interface for a tool (e.g., a wrench or ratchet drive).

Yet another alternative embodiment of an access cover assembly 1000 of the present disclosure is shown in FIG. 16. In the embodiment of the access cover assembly 1000 shown in FIG. 16, like the access cover assemblies 10, 100 discussed above, the access cover assembly 1000 shown in FIG. 16 generally includes a cover plate 1200 and a removable, threaded, self-locking plug 1400 configured to detachably connect to the cover plate 1200. The self-locking plug 1400 incorporates a lock ring 3200 that is co-operable with a detent interface 2200 associated with the cover plate 1400 to inhibit unintended rotation and loosening of the self-locking plug 1400 when assembled to the cover plate 1200. The self-locking plug 1400 nevertheless can be quickly and easily installed and removed with a tool.

The cover plate 1200 incorporates a detent interface 2200 that is co-operable with the lock ring 3200 to inhibit unintended loosening. In this respect, the cover plate 1200 of the access cover assembly 1000 of FIG. 16 can include a boss 2200a projecting from the central portion 2400. The boss 2200a can have an outer diameter and include an outer cylindrical wall 2200d. The outer cylindrical wall 2200d of the boss 2200a can define an external screw thread. The self-locking plug 1400 can engage the threaded outer cylindrical wall 2200d of the boss 2200a when the self-locking plug 1400 is secured to the cover plate 1200, as further described herein.

A first aperture 1600a, having a first diameter can extend through both the boss 2200a and the central portion 2400 of the cover plate 1200. A second aperture 1600b in the boss 2200a having a second diameter that is greater than the first diameter and being concentric with the outer cylindrical wall 2200d of the boss 2200a, has a depth that is less than a height of the boss 2200a. The second aperture 1600b can include the detent interface 2200 having a plurality of spaced-apart, concave-shaped detents 2200b that are equally spaced about a perimeter of the second aperture 1600b. Adjacent detents 2200b can be separated from one another by discrete cylindrically shaped sections of the second aperture 1600b. The number of detents can vary with a range of between about 8 and 16 detents being exemplary.

The boss 2200a can define an interface port for the self-locking plug 1400 and the first aperture 1600a can define an access opening 1600 through the cover plate 1200. Like the previously described access cover assemblies 10, 100, and as can be understood with reference to FIG. 16, the boss 2200a can, alternatively, be integrally formed with the cover plate 1200 or be a separate component that is securely affixed to the cover plate 1200. Further, it is also contemplated that the detent interface 2200 can be integrally formed in the second aperture 1600b of the boss 2200a or, alternatively, can be provided by way of a separate detent interface component (e.g., a detent ring 22a, FIG. 13) that can be secured within the second aperture 1600b of the boss 2200a.

Also shown in FIG. 16 is a removable, threaded, self-locking plug 1400 configured to detachably connect to the cover plate 1200. The self-locking plug 140 can comprise a cylindrical, cap-like main body 3000 and a lock ring 3200 that is attached to the main body 3000. The main body 3000 can include a sleeve 3002 comprising an internal, cylindrically shaped surface 3004 defining an internal screw thread. It can be understood that the self-locking plug 1400 can be configured to accommodate a tool (e.g., a wrench or ratchet drive) for rotating the self-locking plug 1400 about a centerline or central axis X1000 of the self-locking plug 1400 (e.g., an exterior of the main body 3000 can incorporate tool-engaging "flats", such as for a wrench or socket). The internally threaded 3004 sleeve 3002 can engage the external screw thread 2200c of the boss 2200a of the cover plate 1200 when the self-locking plug 1400 is connected to the cover plate 1200.

The lock ring 3200 of the self-locking plug 1400 includes an upper section 3220 that is attached to the main body 3000 and a plurality of resilient, flexible (e.g., spring-like) beam fingers 4000 that are arranged about a circumference of the upper section 3220. Each beam finger 4000 extends from a proximal end 4200 (at a cylindrical portion of the upper section 3220 of the lock ring 3200) to a distal end 4400 that forms a fingertip 4600. Each fingertip 4600 of the beam fingers 4000 includes a plurality of beveled surfaces 4800. The number of beam fingers can vary, with a range of between about 12 to 20 being exemplary.

In an aspect of the access cover assembly 1000 shown in FIG. 16, the beveled surfaces 4800 of the fingertips 4600 of the beam fingers 4000 can be located on the outer side of the beam fingers 4000 (i.e., outwardly facing away from the centerline X1000 of the self-locking plug 1400). The fingertip 4600 is, thus, configured to mechanically interact with (e.g., exhibit a bias against) the detent interface 2200 of the second aperture 1600b so as to inhibit rotation of the self-locking plug 1400 about the central axis X1000.

Figure 6:
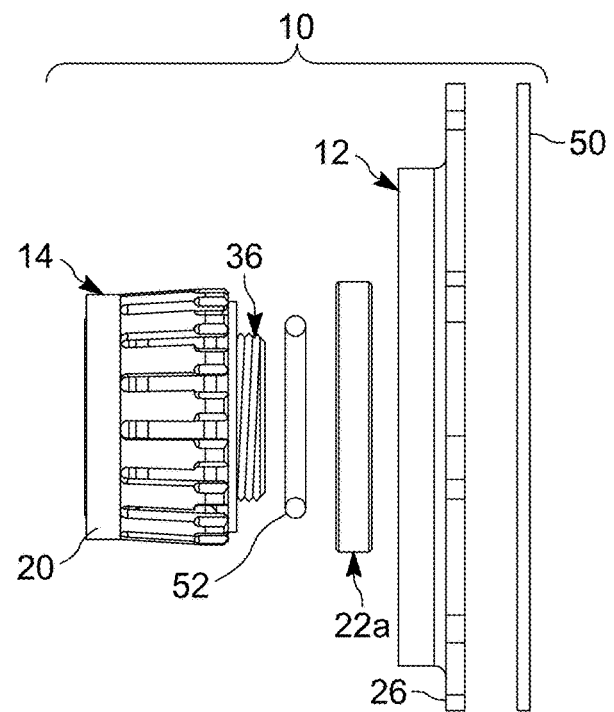
FIG. 6 shows an exploded right side view of the access cover assembly of FIG. 2.
Figure 7:
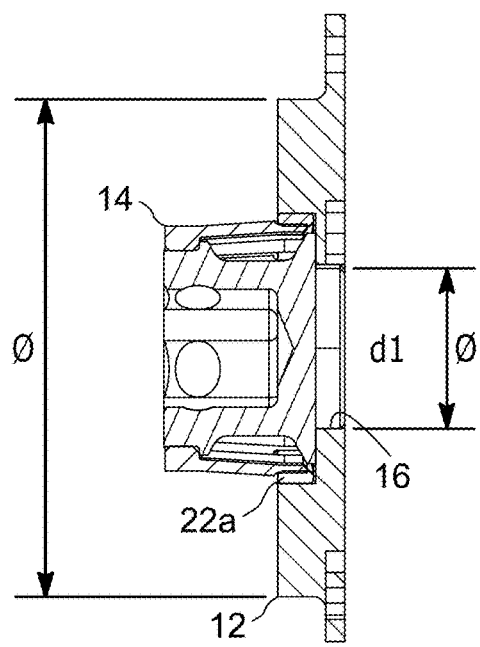
FIG. 7 shows a cross-sectional view along the section line 7-7 of the access cover assembly of FIG. 3.

In still another aspect of the disclosure, the access cover assembly 10, 100, 1000 may incorporate one or more seals (see, e.g., FIG. 6) to provide fluid-tight interfaces between the access cover assembly 10, 100, 1000 and the apparatus. For example, a seal or gasket 50 may be employed between the cover plate 12, 120, 1200 (e.g., at the mounting flange 26, 260, 2600) and the mounting surface of the apparatus. Alternatively, or in addition, a seal such as an O-ring 52, can be included between the self-locking plug 14, 140, 1400 and the cover plate 12, 120, 1200 (e.g., between a threaded shaft 36, 360 or sleeve 3002 and a cover plate aperture 16a, 160a or boss 2200d).

In another aspect of the invention, the dimension(s) of the access opening 16, 160, 1600 can be varied to accommodate different size(s) (e.g., within the overall dimensions of the cover plate 12, 120, 1200) to provide any needed or desired access to the apparatus. Additionally, the size of the self-locking plug 14, 140, 1400 can likewise be varied to correspond to the various size(s) of the access opening 16, 160, 1600.

The access cover assembly 10, 100, 1000 of the present disclosure can be retro-fit to machines, equipment, mechanical assemblies and like apparatus in the field, replacing existing access covers. Still further, existing access covers can be reworked, re-purposed or reconfigured to the access cover assembly of the present disclosure.

The access cover assembly 10, 100, 1000 of the present disclosure enables maintenance and/or inspection tasks to be performed more efficiently, reducing apparatus downtime and labor.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An access cover assembly comprising:
   a cover plate and a self-locking plug removably attached to the cover plate;
   the cover plate comprising a central portion and a mounting flange positioned about a perimeter of the central portion;
   the flange comprising a plurality of apertures configured to accommodate a plurality of mounting bolts;
   the cover plate comprising a first aperture having a first diameter and a second aperture having a second diameter that is greater than the first diameter;
   the first aperture being centered on a central axis and extending through the central portion, the first aperture comprising a first inner circumferential wall comprising an internal screw thread;
   the second aperture being centered on the central axis and concentric with the first aperture, the second aperture extending into the central portion to a depth that is less than a thickness of the central portion;
   a second inner circumferential wall defining one of the first and second apertures and presenting a plurality of concave-shaped detents equally spaced about a perimeter of the second inner circumferential wall, wherein adjacent detents are separated from one another by a generally planar surface;
   the self-locking plug being disposed in the first aperture and the second aperture along the central axis;
   the self-locking plug comprising a main body and a lock ring, coaxially aligned with the central axis; and the lock ring attached to the main body;
   the main body comprising a head and a shaft, the head being configured to receive a tool for rotating the self-locking plug about the central axis, the shaft comprising an external screw thread configured to engage the internal screw thread of the first aperture of the cover plate in a first rotational direction to couple the self-locking plug to the cover plate;
   the lock ring comprising a cylindrical portion attached to the head and a plurality of resilient, flexible beam fingers arranged about a circumference of the main body, each beam finger extending from a proximal end at the cylindrical portion to a distal end comprising a fingertip spaced from the main body;
   each fingertip of the plurality of beam fingers comprising an outer surface that presents beveled surfaces and a substantially planar surface between the beveled surfaces, with the beveled surfaces being beveled radially inward relative to the central axis;
   the plurality of beam fingers being normally biased radially outwardly relative to the central axis and against the second inner circumferential wall of the second aperture; and
   wherein the radially outwardly bias of the plurality of beam fingers causes the beveled surface of each respective fingertip to mechanically interact with the detents of the second inner circumferential wall of the second aperture to inhibit unintended rotation and loosening of the self-locking plug about the central axis.

2. The access cover assembly of claim 1, wherein the second inner circumferential wall is presented on an inner detent ring surface of a detent ring fixedly disposed in the second aperture, wherein the inner detent ring surface is the second inner circumferential wall and presents the plurality of concave-shaped detents.

3. The access cover assembly of claim 2, wherein the detent ring presents an inner surface and an outer surface, and wherein the inner surface comprises the plurality of concave-shaped detents that are equally spaced about the perimeter of the second inner circumferential wall, and the outer surface is configured to couple the detent ring to the second aperture.

4. The access cover assembly of claim 1, wherein the bias of the beam fingers results from a resiliency and flexibility of the beam fingers.

* * * * *